F. M. ASHLEY.
WATER GAGE.
APPLICATION FILED SEPT. 20, 1900.
937,276.
Patented Oct. 19, 1909.
6 SHEETS—SHEET 1.
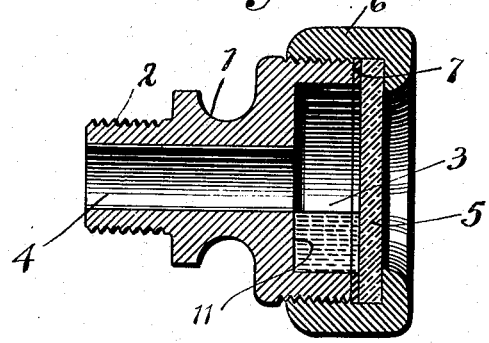
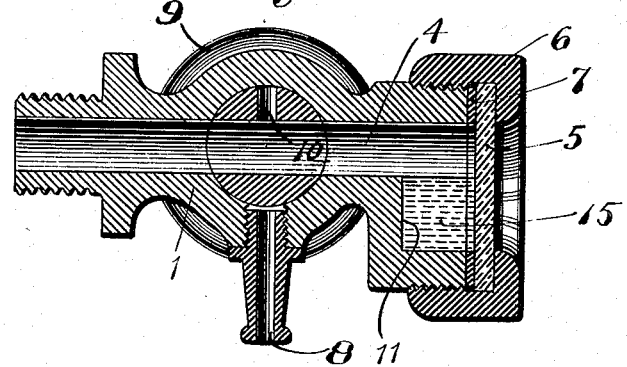
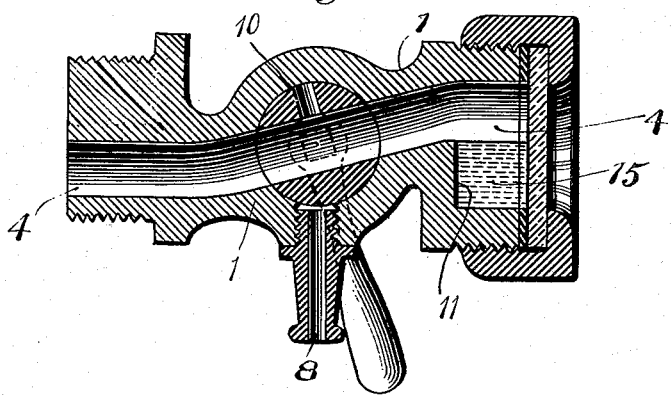
WITNESSES
Arthur Ashley
Geo. W. Ives
INVENTOR
Frank M. Ashley
by C. N. Edwards ATTY.

F. M. ASHLEY.
WATER GAGE.
APPLICATION FILED SEPT. 20, 1900.

937,276.

Patented Oct. 19, 1909.
6 SHEETS—SHEET 2.

WITNESSES:
Geo. B. Rowley.
Geo. W. Hess.

INVENTOR
Frank M. Ashley
BY
C. W. Edwards
ATTORNEY

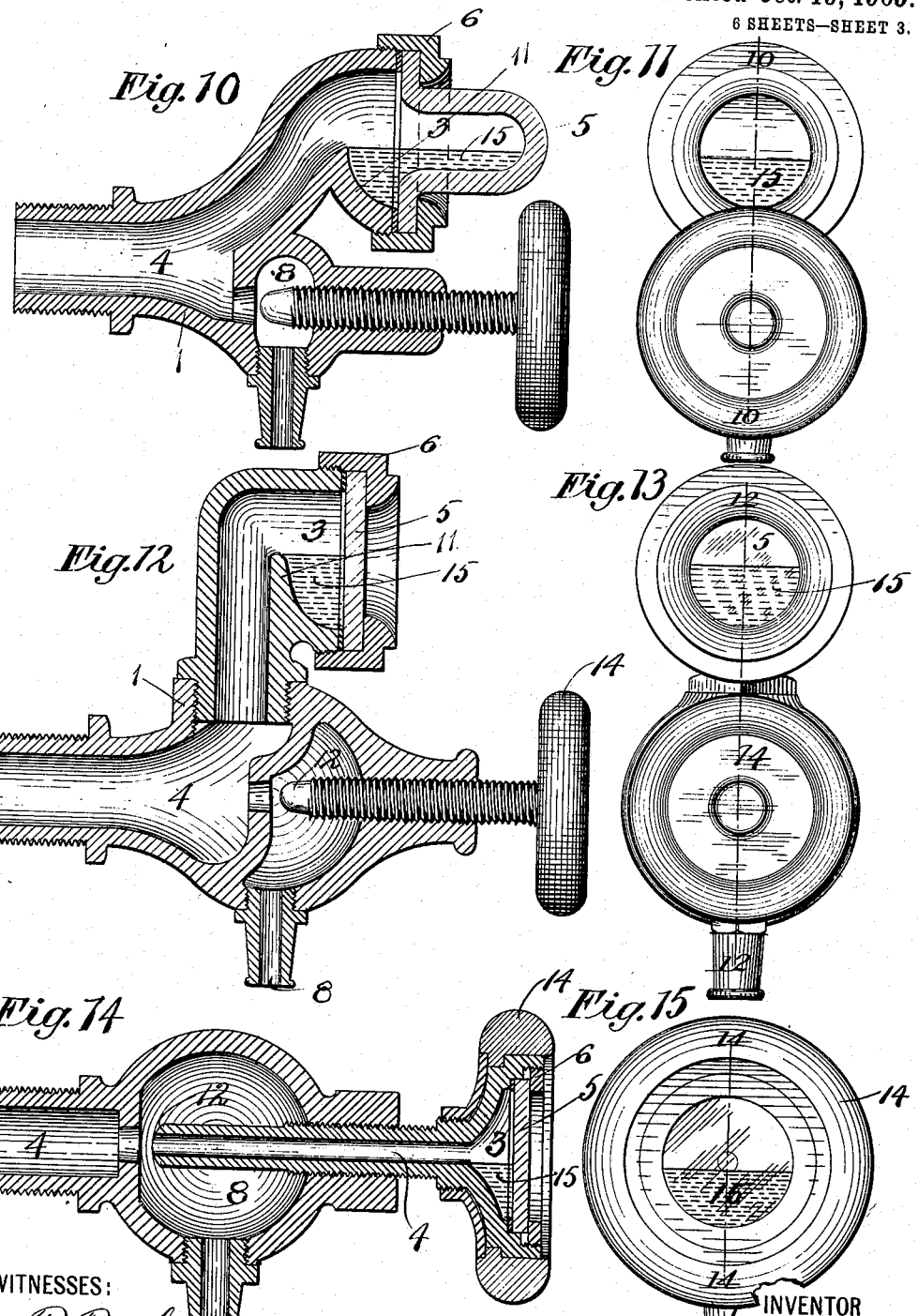

F. M. ASHLEY.
WATER GAGE.
APPLICATION FILED SEPT. 20, 1900.
937,276.
Patented Oct. 19, 1909.
6 SHEETS—SHEET 4.
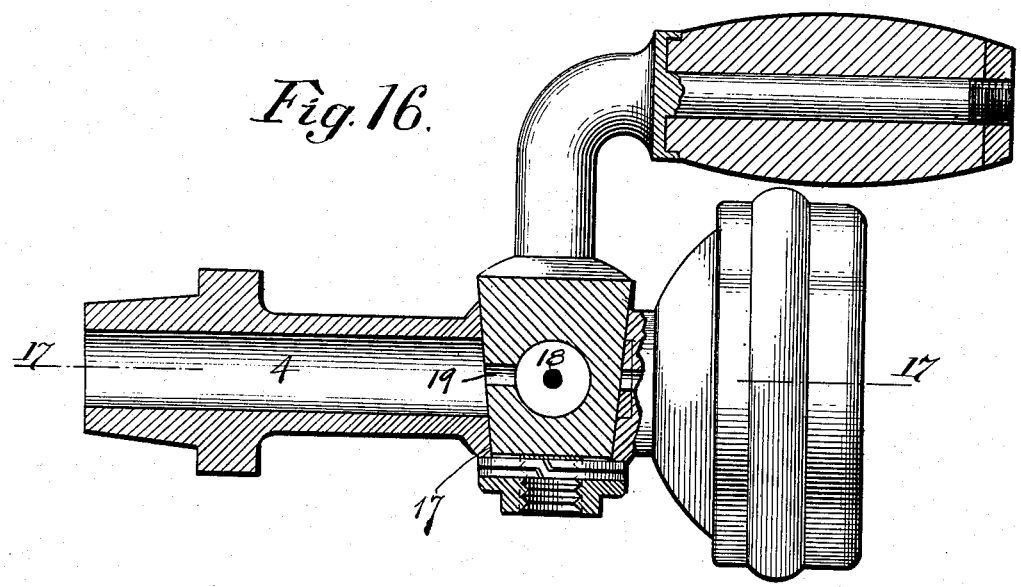
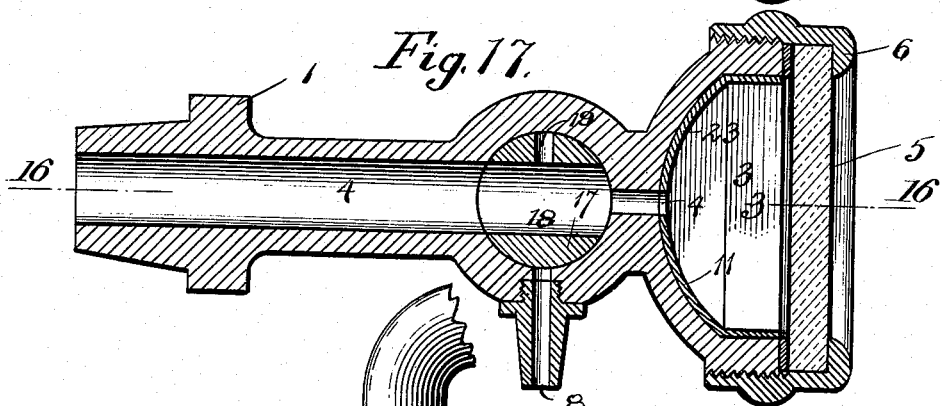
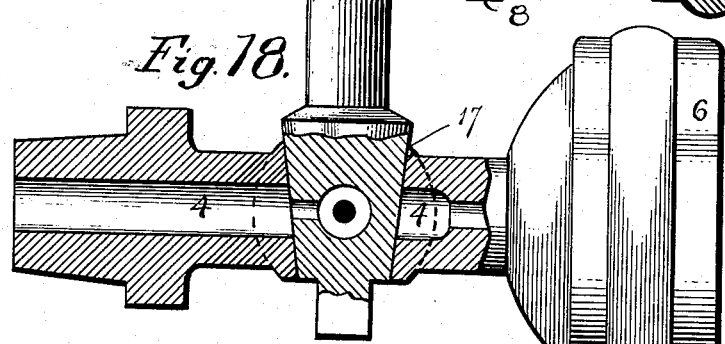
Witnesses
Geo. W. Hess.
E. Strickland
Inventor
Frank M. Ashley
By his Attorney
C. W. Edwards F. M. ASHLEY.
WATER GAGE.
APPLICATION FILED SEPT. 20, 1900.
937,276.
Patented Oct. 19, 1909.
6 SHEETS—SHEET 5.
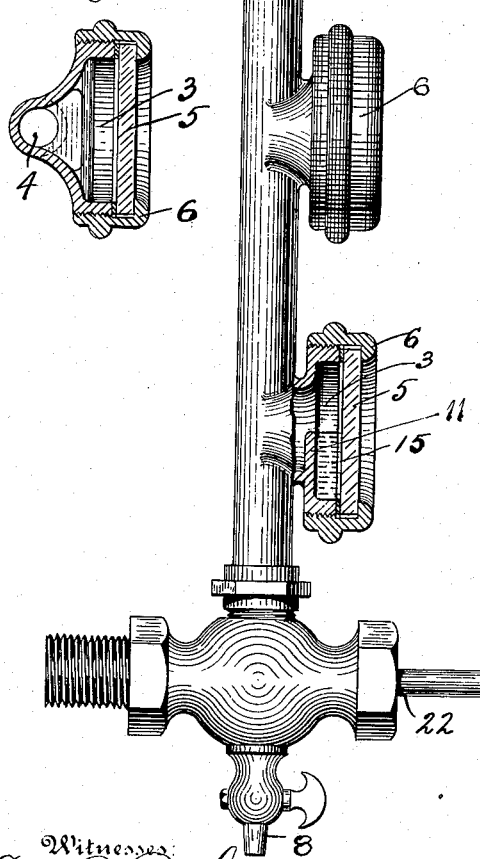
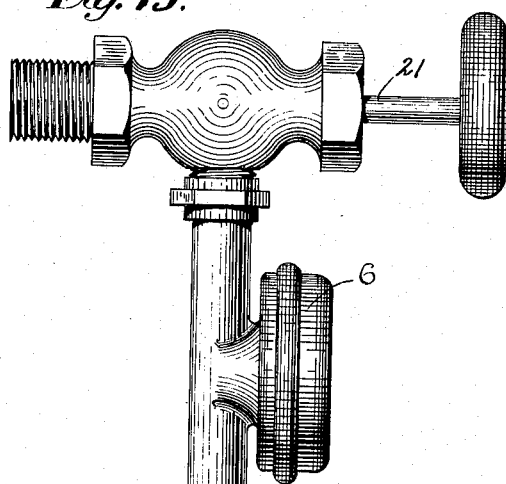
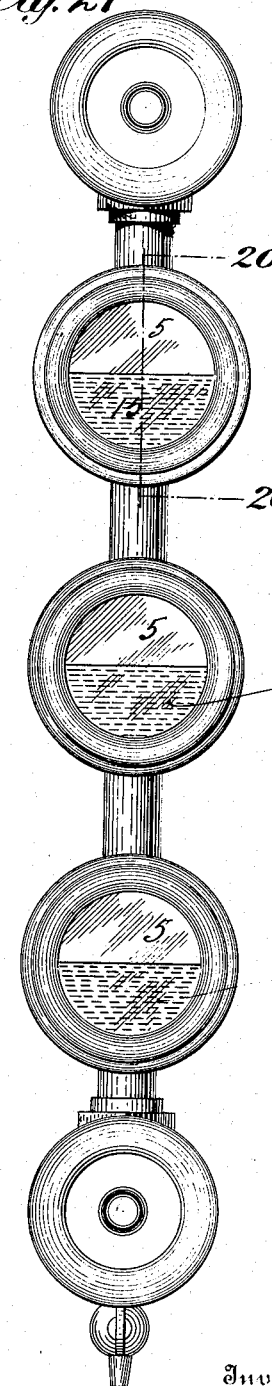

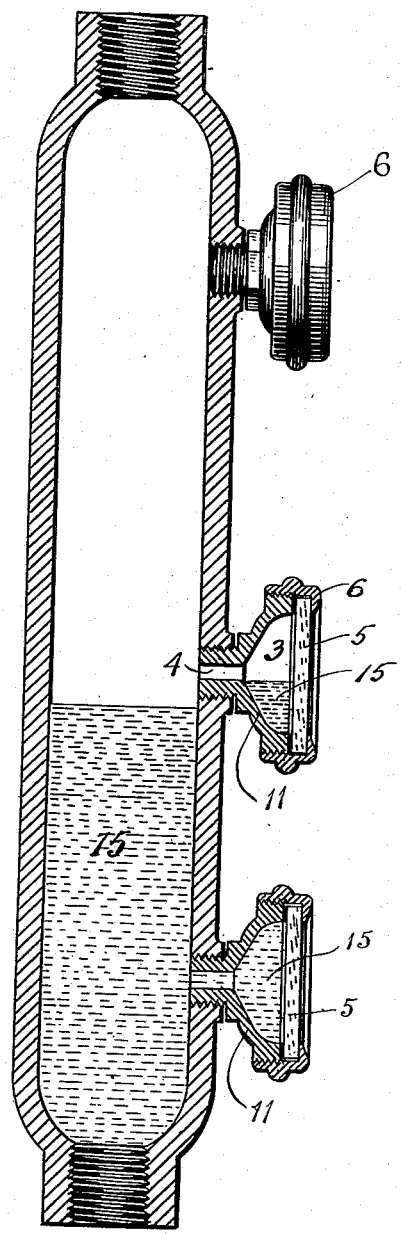

UNITED STATES PATENT OFFICE.

FRANK M. ASHLEY, OF BROOKLYN, NEW YORK, ASSIGNOR OF ONE-HALF TO ALBERT T. SCHARPS, OF NEW YORK, N. Y.

WATER-GAGE.

937,276.  Specification of Letters Patent.  Patented Oct. 19, 1909.

Application filed September 20, 1900. Serial No. 30,608.

*To all whom it may concern:*

Be it known that I, FRANK M. ASHLEY, a citizen of the United States, residing at No. 63 Central Place, Brooklyn, in the county of Kings and State of New York, have invented certain new and useful Improvements in Water-Gages, of which the following is a full, clear, and exact specification.

This invention relates to water gages for steam boilers and the like, and its object is to construct a gage which shall be simple in construction and at the same time will give indication of the height of the water or other fluid in the receptacle to which it is attached in a positive and certain manner.

A further object is to provide a gage which shall not be liable to breakage of glass by reason of sudden changes of temperature or other cause.

The invention will be more particularly described hereinafter with reference to the accompanying drawings in which various forms which the invention may take in practice are shown.

Figure 4:
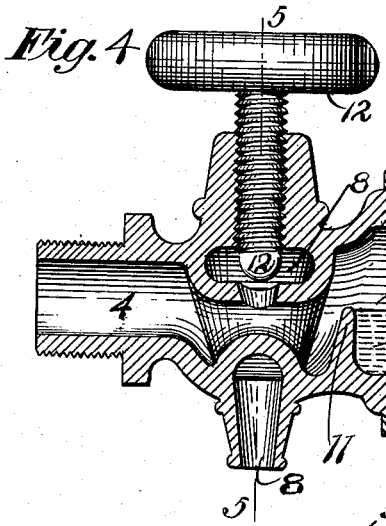
Figures 5, 6:
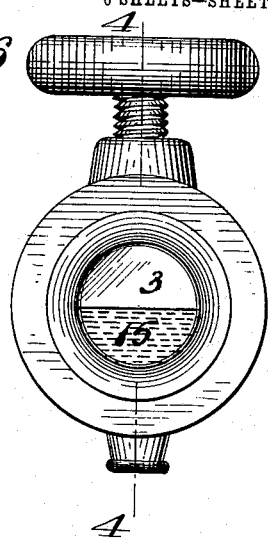
Figure 7:
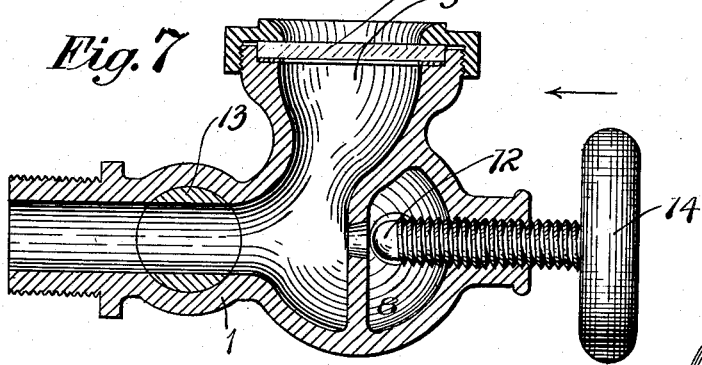
Figure 9:
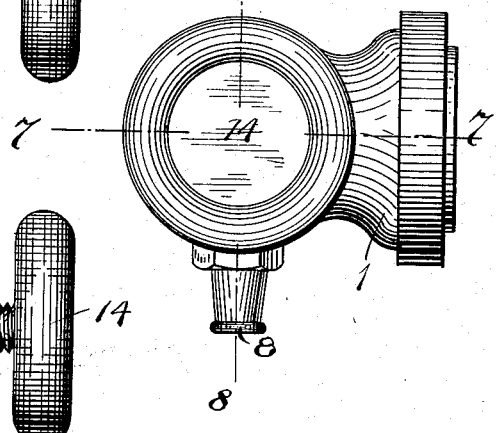
Figure 8:
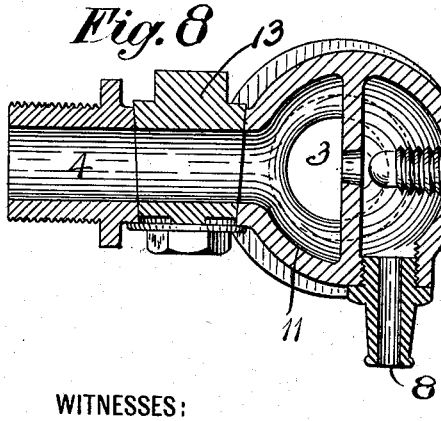

In the drawings, Figure 1, is a central vertical longitudinal sectional view of a gage constructed in accordance with my invention. Figs. 2 and 3, are similar views of modified forms of the invention. Fig. 4, is a vertical longitudinal sectional view of still another form of the invention, the section being in the plane indicated by the broken line 4—4, Fig. 6. Fig. 5, is a vertical transverse section of the construction disclosed in the preceding figure, the plane of section being that indicated by the broken line 5—5, Fig. 4, and the valve handle being omitted. Fig. 6, is a front elevation of the gage illustrated in Fig. 4. Fig. 7, is a sectional plan of a further form of the invention, the plane of section being that indicated by the broken line 7—7, Fig. 9. Fig. 8, is a vertical longitudinal sectional view of the gage last referred to, the plane of section being that indicated by the broken line 8—8, Fig. 9. Fig. 9, is an elevational view of the gage disclosed in the preceding two figures and looking in the direction of the arrow, Fig. 7. Fig. 10, is a vertical longitudinal sectional view of another embodiment of the invention, the plane of section being that indicated by the broken line 10—10, Fig. 11. Fig. 11, is a front elevational view of the gage disclosed in the preceding figure. Fig. 12, is a vertical longitudinal sectional view of still another form of the gage, the plane of section being that indicated by the broken line 12—12, Fig. 13. Fig. 13, is a front elevational view of the gage set forth in Fig. 12. Fig. 14, is a vertical longitudinal sectional view of another modification of the invention, the plane of section being that indicated by the broken line 14—14, Fig. 15. Fig. 15, is a front elevational view of the gage shown in Fig. 14. Fig. 16, is a view, partly in longitudinal sectional plan, illustrating another construction of the gage, the plane of section being that indicated by the broken line 16—16, Fig. 17. Fig. 17, is a vertical longitudinal sectional view of the gage last referred to, the plane of section being that indicated by the broken line 17—17, Fig. 16. Fig. 18, is a view partly in central vertical longitudinal section, of a slightly modified form of the gage shown in Fig. 16. Fig. 19, is a side view, partly in section, of a gage, or column alarm comprising a number of distinct gages. Fig. 20, is a detail vertical sectional view of one of the gages disclosed in Fig. 19, the plane of section being that indicated by the broken line 20—20, Fig. 21. Fig. 21, is a front elevational view of the construction illustrated in Fig. 19. Fig. 22, is a vertical sectional view of a water column with my improved water gages mounted thereon, to illustrate their proper position on a column.

Referring more particularly to the drawings, 1 represents the body of the gage, having a screwthread 2 adapted to engage a similar thread on the boiler, or in lieu thereof other suitable means may be provided for attaching the device to the boiler, or other receptacle, such for instance as the columns shown in Figs. 19 to 22, in which is contained water or other liquid the height of which is to be gaged. The body, or column, may be of any suitable shape or design and communicate with the boiler or receptacle by any convenient means. In the body is formed a trapping chamber 3 communicating with the boiler or column by means of a passage 4. The chamber and passage may be of any design or shape, but the lower portion of the chamber should extend below the trapping wall 11 in the passage, in order that when water, or other fluid, enters the chamber through the passage a portion of the water will be trapped in the chamber and prevented from flowing back into the boiler. The chamber, preferably, however, is of such shape that when the liquid flows back into the boiler enough of it will not be trapped to entirely fill the chamber. A cover 5 of glass or other suitable transparent or translucent material is clamped against the body 1 over the chamber 3 by means of an annular ring 6 or other suitable means. A ring of packing material 7 may be inserted between the glass and the boiler. In the operation of the device, when the water in the boiler reaches the level of passage 4 it will flow therethrough into the chamber 3 and as long as the level of the water in the boiler is above the top of chamber 3, the glass 3 will not be changed in appearance, but as soon as the water level drops in the boiler it will also drop in the chamber 3 and a dark line, being the line of the water level in the chamber, will appear across the glass 5. When the water in the boiler drops below the top of the trapping wall 11 this line will still appear upon the glass because some of the water will be trapped within the chamber. Therefore, as long as the water level in the boiler is above the gage no indication will appear upon the glass, but as long as it is below the passage a line will appear across the glass.

In the modification shown in Fig. 2 the chamber 3 is made eccentric to the passage 4 in order that that portion of the chamber within which water is trapped may be made larger. In this instance the gage is provided with a blow-off passage 8 controlled by a valve 9, the latter having a blow-off passage 10 at an angle to the main passage 4 whereby the blow off outlet may be opened without closing passage 4 and whereby with the same valve the passage 4 may be closed at the time the blow off passage is opened. In Fig. 3 substantially the same construction is shown except that to avoid the difficulty of turning the eccentric chamber and screw thread upon the body, the chamber, body and screw threads are made concentric but the passage 4 is correspondingly curved. Although this form is more economical so far as the formation of the exterior of the body is concerned, yet it is itself expensive in that the passage 4 must be correspondingly curved.

In Fig. 4 instead of forming with a straight passage 4 the body is cast with the trapping wall 11 which serves to trap the water in chamber 3. In this instance the passage 4 is always open, but the blowoff passage 8 is controlled by the valve 12 which is suitably mounted in the body.

15 represents the water in the gage in all of the various illustrations.

In Figs. 7 and 8 the glass is located at the side of the body and the passage 4 is controlled by a valve 13. The valve 12 controlling the blowoff passage 8 is operated in substantially the same manner but the handle 14 thereof is located in front of the valve.

In Fig. 10 a modified form of glass is shown, it being made tubular in form in order that the water line therein may be seen from the sides as well as from directly in front of the gage.

In Fig. 12 the chamber 3 is located above the valve 12 controlling the blowoff passage and the body portion is correspondingly altered.

In Fig. 14 the handle 14 which operates the valve 12 controlling the blow off passage 8 serves as a casing containing the walls of chamber 3 and also the glass 5. In this case the passage 14 is formed in the stem of the valve 12.

In Figs. 16, 17 and 18 the plug 17 contains two passages 18 and 19 adapted to register respectively with the main and with the blow off passages. In this instance the trapping chamber is provided with a lining of white enamel 23 against which the water line appears more clearly.

In Figs. 19 to 21 the column is suitably connected to the boiler and the passages thereto controlled by the valves 21 and 22. The trapping chambers communicate with the interior of the column and are located one above the other. The height of water in the boiler to which the column is attached is therefore determined by the number of glasses in which a water line can be seen. If the water in the boiler is below all the gages a water line will appear in all, as shown in Fig. 21.

In Fig. 22 the chamber 4 and passage 3 are formed in a casting adapted to be screwed or otherwise attached to the column or boiler.

In operation, where the gage is used in connection with steam boilers, or places where the liquid is under pressure, the water line will appear only at the center of the glass, because as soon as the water level in the boiler rises to the opening of the passage 3 the pressure forces the fluid into chamber 4 sufficiently to fill the entire chamber.

It will be seen that the glass used in this construction may be made very thick, the thickness in practice being customarily about three eighths of an inch or more, and also that but a small surface of glass is exposed to the steam and water, or to damage by blows from outside the gage. Therefore there is a minimum of danger of the glass bursting or breaking under pressure or changes in temperature, or from blows.

Having thus described my invention, I declare that what I claim as new, and desire to secure by Letters Patent, is:

1. A water gage comprising a body having a conduit throughout its length, a recess formed at one end thereof, a transparent member extending across said recess and thereby forming a trapping chamber, means for holding said transparent member to said body portion, and means adapted for uniting said body portion to a receptacle.

2. A water gage comprising a body having a conduit throughout its length, a recess formed at one end thereof, and a member extending across said recess and thereby forming a trapping chamber.

3. A water gage comprising a body having a conduit throughout its length, a recess formed at one end thereof, a member extending across said recess and thereby forming a trapping chamber, and removable means for holding said last named member to the body.

4. A water gage comprising a body portion, a glass disk, and a ring, the said body portion and disk forming a fluid trap, a passage extending from the trap to the atmosphere, and the ring serving to bind the said parts together.

5. A water gage comprising a body portion containing a fluid conduit, a glass, means for securing the glass to said body portion, said body portion and glass thereby forming a trap, the top of which communicates with said fluid conduit, and a shank portion formed on said body portion and adapted to engage a steam boiler or other mechanical device.

6. A water gage comprising a casting having a depression in its face and a conduit extending from said depression to the opposite end of the casting, said conduit extending upwardly to about the top of said depression from the center thereof, a glass member fitting the said face and thereby forming a trapping chamber, and means for holding said glass member to said casting.

7. A water gage comprising a body having a conduit throughout its length, a recess formed at one end thereof, a glass extending across said recess and thereby forming a trapping chamber, and means for holding said glass to said body portion.

8. A water gage comprising a body portion having a conduit throughout its length, a recess formed at one end thereof, a glass extending across said recess and thereby forming a trapping chamber, means for holding said glass to said body portion and a valve controlling said conduit.

9. A water gage comprising a body portion having a conduit throughout its length, a recess formed at one end thereof, a glass extending across said recess and thereby forming a trapping chamber, means for holding said glass to said body, a valve fitted in said body and adapted to control said conduit and also to control an outlet passage formed in the body and leading to the atmosphere.

In testimony whereof I affix my signature, in presence of two witnesses.

FRANK M. ASHLEY.

Witnesses:
C. V. EDWARDS,
GEO. W. HESS.